United States Patent Office 3,362,892
Patented Jan. 9, 1968

3,362,892
MOLECULAR DISTILLATION PROCESS FOR THE RECOVERY OF A FERULIC ACID ESTER OF TRITERPENE ALCOHOL
Yasuo Watanabe, 231–7 Mukaihara 3-chome, Itabashiku, and Tsukasa Arawaka, 2113 Kamihoya Hoyacho, Kitatamagun, both of Tokyo, Japan, and Toshio Takahashi, 1746 Shiki Adachimachi, Kitaadachigun, Saitamaken, Japan
No Drawing. Filed Feb. 13, 1967, Ser. No. 615,385
Claims priority, application Japan, Mar. 10, 1966, 41/14,901
4 Claims. (Cl. 203—89)

ABSTRACT OF THE DISCLOSURE

Method for producing concentrated Oryzanol by collecting a distillate in the range of 280° C. to 300° C. under a reduced pressure of $10^{-3}$ mm. Hg to $10^{-4}$ mm. Hg abs. in the molecular distillation of dark oils of rice-bran.

Cross-reference

Japanese Patent No. 227,801.

Brief description of invention

This invention relates to a method for concentrating Oryzanol from dark oils of rice-bran by molecular distillation.

Detailed description of invention

The words "dark oils" used throughout in this specification and claims means a dark oil of rice-bran or a product obtained by esterifying free fatty acids included in the dark oil of rice-bran with methyl alcohol or ethyl alcohol.

Oryzanol is a product obtained from rice-bran by extraction and purification and a mixture of ferulic acid (4-hydroxy-3 methoxy cinnamic acid) ester of triterpene alcohol.

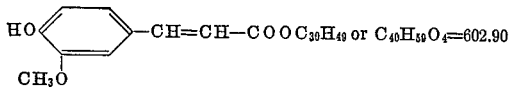

HO—⟨⟩—CH=CH—COOC$_{30}$H$_{49}$ or C$_{40}$H$_{59}$O$_4$=602.90
    |
   CH$_3$O

It is a white or slightly yellowish powder having no odour or a slight odour and tasteless. It is readily soluble in chloroform, moderately soluble in acetone, ether or benzene and hardly soluble in water. Its absorbency $$E_{1\,cm.}^{1\%} \ (328 \ m\mu)$$

is 350–390 (0.05 g. of dried product, in 5000 ml. of isopropyl alcohol, at a 10 mm. layer).

It has been known as an active principle of pharmaceutical composition effective to automatic imbalance, menopausal, middle-aged and after castration. As for methods for producing Oryzanol concentrates, there has known a method disclosed in the Japanese Patent No. 227,801 which employs molecular distillation to produce Oryzanol from rice-bran oil or oil of embryo bud of rice. According to this method, Oryzanol is concentrated mostly in a distillate ranging from 200° C. to 230° C. in the falling-film type molecular distillation carried out under a reduced pressure in the range of $10^{-3}$ mm. Hg to $10^{-4}$ mm. Hg.

An object of the present invention is to provide a method for producing an Oryzanol having a concentration higher than the one produced in the prior art method.

Such an object can be attained by the method of the present invention. It has now been found by the present inventors that when a dark oil of rice-bran or methyl ester of a dark oil of rice-bran is subjected to a molecular distillation under a reduced pressure of $10^{-3}$ mm. Hg to $10^{-4}$ mm. Hg by using a falling-film type molecular distillation apparatus, the Oryzanol is hardly concentrated in the distillate of 200° C. to 230° C., it is distilled rather at a temperature from 240° to 300° C. and is mostly concentrated in the distillate ranging from 280° C. to 300° C.

This tendency was confirmed both by a laboratory type falling film molecular distillation apparatus having an evaporation surface area of 240 cm.$^2$, a distance between the evaporation surface and the condensation surface of 10 mm., and equipped with a heating system by a hot oil and an exhausting system consisting of a rotary pump having an exhausting velocity of 200 l./min. and a 4″ oil diffusion pump having an exhausting velocity of 350 l./sec. at $10^{-4}$ mm. Hg and by a commercial falling film molecular distillation apparatus having an evaporation surface area of 0.58 m.$^2$, a distance between the evaporation surface and the condensation surface of 30 mm. and equipped with a heating system by a vapor of hot heating medium oil and an exhausting system consisting of a rotary pump having an exhausting velocity of 3000 l./min., a 3″ oil diffusion pump having an exhausting velocity of 60 l./sec. and an 8″ oil diffusion pump having an exhausting velocity of 700 l./sec.

As for the difference between a dark oil of rice-bran and methylester of the dark oil of rice-bran, there are slight differences in the distillation temperature and state but the distillation temperature of Oryzanol was the same in both the cases.

Following examples are specific illustrations of the present invention. All percents are by weight.

EXAMPLE 1

A methyl ester of dark oil of rice-bran was subjected to molecular distillation by the use of a commercial molecular distillation apparatus.

The results are summarized in Table 1.

TABLE 1.—MOLECULAR DISTILLATION OF METHYLESTER OF DARK OIL OF RICE-BRAN

|  | Vacuum degree (mm. Ng) | Distillation temperature (° C.) | Yield (kg.) | Percent yield relative to oil | $E_{1\,cm.}^{1\%}$ ($\lambda$315 m$\mu$ n-heptane) | Content of Oryzanol (percent) | Percent yield of Oryzanol |
|---|---|---|---|---|---|---|---|
| Original Oil | | | 164.0 | 100.00 | 17.2 | 4.79 | 100.0 |
| Fraction 1 | 4–8×10$^{-4}$ | 210 | 101.2 | 61.70 | 0.11 | 0.30 | 3.87 |
| Fraction 2 | 4–5×10$^{-4}$ | –240 | 4.1 | 2.50 | 13.0 | 4.17 | 2.18 |
| Fraction 3 | The same as in the above fraction. | –260 | 6.5 | 3.97 | 31.9 | 8.88 | 7.30 |
| Concentrated part according to the present invention: | | | | | | | |
| Fraction 4 | do | –280 | 6.0 | 3.66 | 47.2 | 13.15 | 13.31 |
| Fraction 5 | do | –290 | 16.8 | 10.25 | 53.2 | 14.80 | 31.60 |
| Fraction 6 | do | –300 | 16.4 | 10.00 | 37.4 | 10.40 | 20.90 |
| Residue oil | | | 13.0 | 7.93 | 46.7 | 13.00 | 21.50 |

Note.—The contents of Oryzanol were calculated relative to the $E_{1\,cm.}^{1\%}$ ($\lambda$315 m$\mu$, n-heptane) of 359.

EXAMPLE 2

A dark oil of rice-bran was subjected to molecular distillation by the use of a laboratory type molecular distillation apparatus. The results are summarized in Table 2.

TABLE 2.—MOLECULAR DISTILLATION OF DARK OIL OF RICE-BRAN

|  | Vacuum degree (mm. Hg) | Distillation temperature (° C.) | No. of cycle | Yield (g.) | Percent yield relative to oil | Content of Oryzanol (percent) | Percent yield of Oryzanol |
|---|---|---|---|---|---|---|---|
| Original oil | | | | 1,834.0 | 100.0 | 4.62 | |
| Fraction 1 | 1×10⁻³ | −100 | 1 | 208.0 | 11.3 | | 0 |
| Fraction 2 | The same as in the above fraction. | −180 | 1 | 759.0 | 41.4 | | 0 |
| Fraction 3 | do | −220 | 1 | 236.0 | 12.8 | 0.30 | 0.83 |
| Fraction 4 | 5×10⁻⁴ | −230 | 1 | 26.8 | 1.46 | 3.1 | 0.98 |
| Fraction 5 | The same as in the above fraction. | −240 | 1 | 29.2 | 1.59 | 4.5 | 1.65 |
| Fraction 6 | do | −250 | 1 | 31.7 | 1.73 | 7.1 | 2.66 |
| Fraction 7 | 3×10⁻⁴ | −260 | 1 | 44.5 | 2.42 | 12.0 | 6.44 |
| Fraction 8 | 3-1×10⁻⁴ | −270 | 1 | 45.5 | 2.48 | 18.0 | 9.67 |
| Concentrated part according to the present invention: | | | | | | | |
| Fraction 9 | The same as in the above fraction. | −280 | 1 | 42.7 | 2.33 | 24.0 | 12.10 |
| Fraction 10 | do | −290 | 1 | 50.0 | 2.72 | 24.3 | 14.40 |
| Fraction 11 | do | −300 | 2 | 81.8 | 4.46 | 20.0 | 19.40 |
| Fraction 12 | do | −300 | 4 | 144.9 | 7.88 | 11.0 | 18.77 |
| Residual oil | | | | 85.2 | 4.65 | 9.0 | 9.06 |

NOTE.—The contents of Oryzanol were calculated relative to the $E_{1\,cm}^{1\%}$ ($\lambda 315$ m$\mu$, n-heptane) of 359.

What is claimed is:

1. A method of recovering a ferulic acid ester of triterpene alcohol comprising subjecting dark oil of rice-bran containing a ferulic acid ester to molecular distillation, and collecting a distillate in the range of 280° C. to 300° C. under reduced pressure within the range of $10^{-3}$ mm. Hg to $10^{-4}$ mm. Hg.

2. A method according to claim 1 wherein a methyl ester of dark oil of rice-bran is subjected to molecular distillation.

3. A method according to claim 1 wherein said molecular distillation is of the falling film type.

4. A method according to claim 2 wherein said molecular distillation is of the falling film type.

No references cited.

WILBUR L. BASCOMB, JR., *Primary Examiner.*

F. E. DRUMMOND, *Assistant Examiner.*